US006813304B2

(12) United States Patent
Hook et al.

(10) Patent No.: US 6,813,304 B2
(45) Date of Patent: Nov. 2, 2004

(54) HIGH ENERGY DF CHEMICAL LASER GAIN GENERATOR AND RELATED METHOD FOR ITS FABRICATION

(75) Inventors: Dale L. Hook, Rancho Palos Verdes, CA (US); Thomas J. Engler, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 40 days.

(21) Appl. No.: 09/886,765

(22) Filed: Jun. 21, 2001

(65) Prior Publication Data

US 2003/0138018 A1 Jul. 24, 2003

(51) Int. Cl.[7] .......................... H01S 3/04; H01S 3/095; H01S 3/09; H01S 3/00; F23R 17/00

(52) U.S. Cl. ............................ 372/89; 372/34; 372/90; 372/701; 471/158

(58) Field of Search ............................. 372/89, 90, 34, 372/701, 35, 55, 68, 73; 471/158; 431/121

(56) References Cited

U.S. PATENT DOCUMENTS 4,453,914 A * 6/1984 Huniu et al. ................ 431/121
4,650,416 A * 3/1987 Warren et al. .............. 431/121

OTHER PUBLICATIONS

Leroy E. Wilson and Dale L. Hook, “Deuterium Fluoride CW Chemical Lasers,” AIAA 9th Fluid and Plasma Dynamics Conference, San Diego, California, Jul. 14–16, 1976, Paper No. 76–344.

H. H. Mueggenburg and D. C. Rousar, “Platelet Injector Design and Development History,” AIAA Technical Paper, May 17, 1991.

H. H. Mueggenburg, et al., “Platelet Actively Cooled Thermal Management Devices,” AIAA, Jun. 24, 1992.

Dale Hook, et al., “An Ejector System for Space Simulation of the Alpha Laser,” AIAA 23rd Plasmadynamics & Lasers Conference, Nashville, TN, Jul. 6–8, 1992, Paper No. 92–2981.

* cited by examiner

*Primary Examiner*—Paul Ip
*Assistant Examiner*—Armando Rodriguez
(74) *Attorney, Agent, or Firm*—Noel F. Heal

(57) ABSTRACT

A DF or HF chemical laser gain generator fabricated by a platelet technique in which internal passages are more easily formed because the generator is made as a stack of thin platelets that are separately etched and then stacked together. The gain generator is water cooled through passages formed in it during the platelet fabrication process. Water cooling results in lower and more uniform operating temperatures and gas pressures, allowing the use of stronger metals which facilitate the elimination of supporting structures that can degrade laser beam quality. The fabrication method allows for the elimination of gas dynamic and thermally induced density gradients which further degrade laser beam quality.

6 Claims, 2 Drawing Sheets

HIGH ENERGY DF CHEMICAL LASER GAIN GENERATOR AND RELATED METHOD FOR ITS FABRICATION

BACKGROUND OF THE INVENTION

1. Field of the Invention

The present invention relates generally to high energy chemical lasers and, more particularly to difficulties in fabricating a gain generator for a high energy, high pressure, deuterium fluoride (DF) chemical laser or hydrogen fluoride (HF) chemical laser.

2. Description of the Prior Art

A high energy DF or HF chemical laser system generates a laser beam in a gain generator assembly. Basically, the gain generator assembly contains a laser cavity and cavity injectors for the introduction of deuterium ($D_2$) or ($H_2$), atomic fluorine (F) and other gases. The gain generator also includes reactant manifolds and a high-pressure combustor that produces atomic fluorine required for lasing. A practical high energy DF or HF chemical laser system also includes a fluid supply assembly, a pressure recovery assembly, and a laser optics assembly, but these components are not pertinent to the present invention, which is concerned only with the fabrication and structure of the gain generator assembly.

A gain generator assembly typically includes a high pressure, high temperature combustor and a laser cavity and also includes a very large number of very small internal passages for introduction of fluids into the combustor and the cavity. One type of combustor and cavity injector structure used in prior gain generator assemblies was known as the high pressure hypersonic wedge (HPR-HYWND). This type has been chosen for use in a high energy laser demonstration systembecause of its relatively low cost and in spite of its relatively low efficiency. A more efficient gain generator technology was developed for the Mid-infrared Advanced Chemical Laser (MIRACL). Future high energy laser systems would benefit significantly by the use of MIRACL technology. However, fabrication of a gain generator assembly using the MIRACL technology required extensive chemical milling, diffusion bonding, electrodeposited nickel buildups, conventional machining, and the formation of literally millions of small holes of approximately 0.005 inch (13 $\mu$m) diameter by electrical discharge machining (EDM). Unfortunately, these fabrication complexities are immensely multiplied when dealing with gain generators of high energy. The nickel deposition process deposits only 0.001 inch of nickel per hour. Multiple deposition cycles of many hours would be required, and cooling and feed passages must be machined into the deposited nickel and then closed off with additional deposited layers. Machining millions of small trip injection holes added millions of dollars to the cost. Another related difficulty is that larger versions of the gain generator assembly using MIRACL technology suffer from laser beam degradation resulting from wakes induced by internal manifolding and support struts needed to stabilize relatively long blade structures. Prior to the present invention, it was believed to be impractical to fabricate a gain generator assembly using the MIRACL technology, at at reasonable cost, and with a laser beam of acceptable quality.

MIRACL type gain generators utilized prior to the present invention were cooled only by the flow a helium/deuterium gas mixture that flowed through cavity injector blades and was injected into the laser cavity. Although this self-cooled configuration exhibited some desirable attributes, thermal and density gradients in the injected gases caused large unacceptable optical quality degradation in the laser cavity.

The gas cooled design required a tortuous gas cooling passage configuration that exhibited very high pressure losses. Consequently, very high inlet pressures, up to approximately 1,500 psia, were required. In addition, gas cooling necessitated relatively high operating temperatures and, therefore, the use of unalloyed nickel on surfaces exposed to high temperature fluorine gas. Nickel is weaker than high strength nickel alloys, and at high temperatures the nickel structures have high strain rates exceeding the elastic limit of the nickel material. This results in a low cyclic fatigue life of only approximately 1,000 cycles.

It will be appreciated from the foregoing that there is a significant need for improvement in the design of high energy chemical laser gain generator assemblies and in methods for their fabrication. In particular, what is needed is a high energy gain generator assembly that is capable of MIRACL type demonstrated efficiency, operation at relatively low inlet pressure, high or unlimited cyclic fatigue life, but which may be fabricated more conveniently and at less cost than gain generator assemblies of the prior art. The present invention satisfies these requirements.

SUMMARY OF THE INVENTION

The present invention resides in a high energy DF or HF chemical laser gain generator and a method for it's fabrication. Briefly, and in general terms, the laser gain generator of the invention comprises a combustor for generating atomic fluorine (F), including a plurality of combustor injectors, for injecting into the combustor a gas containing fluorine and hydrocarbon fuel (or $D_2$ in the case of an HF laser); a laser cavity in which lasing takes place as a result of a chemical reaction between the atomic fluorine (F) and deuterium ($D_2$) or $H_2$; and a plurality of laser cavity injector blades, for injecting deuterium ($D_2$) or hydrogen ($H_2$) with the atomic fluorine into the laser cavity. The laser cavity injector blades include internal passages for flow of cooling water or other cooling media. The gain generator is formed from a plurality of thin platelets of metal in which all required internal passages for the flow of cooling media and for the flow of diluent and reactive gases are formed by chemical etching of each platelet separately. Because the water-cooled or other cooling media laser gain generator operates at relatively low temperatures, it avoids the need for high gas inlet pressures. Further, lower operating temperatures permit the use of a high-strength alloy for the metal platelet material, thus avoiding the need for supporting structures within the gain generator. In the presently preferred embodiment of the invention, the alloy is Inconel 718 alloy, although other corrosion resistant super alloys such as Haynes alloy L605 could be utilized.

The method of the invention comprises the steps of separately etching each of a plurality of thin metal platelets, to define successive cross sections of a laser gain generator that includes a plurality of laser cavity injector blades with gas passages for the injection of fluorine and deuterium gases, and passages for the flow of cooling media such as water; stacking the etched metal platelets in alignment to form the laser gain generator; and applying heat and pressure to the stacked metal platelets, to fuse them together by diffusion bonding. More specifically, the step of separately etching includes forming cross-sectional slices of a plurality of cooling and gas passages within each of a plurality of cavity injector blades in the laser gain generator.

It will be appreciated from the foregoing that the present invention represents a significant advance in the field of high energy DF or HF chemical lasers. In particular, the invention provides for operation of a laser gain generator at relatively low metal temperatures and gas inlet pressures. The lower temperatures permit use of high-strength super alloy and this, in turn, avoids the need for supporting structures that would otherwise adversely affect laser beam quality. In addition the use of platelet fabrication technology lowers the manufacturing cost dramatically. Other aspects and advantages of the invention will become apparent from the following more detailed description, taken in conjunction with the accompanying drawings.

DETAILED DESCRIPTION OF THE INVENTION

Figure 1:
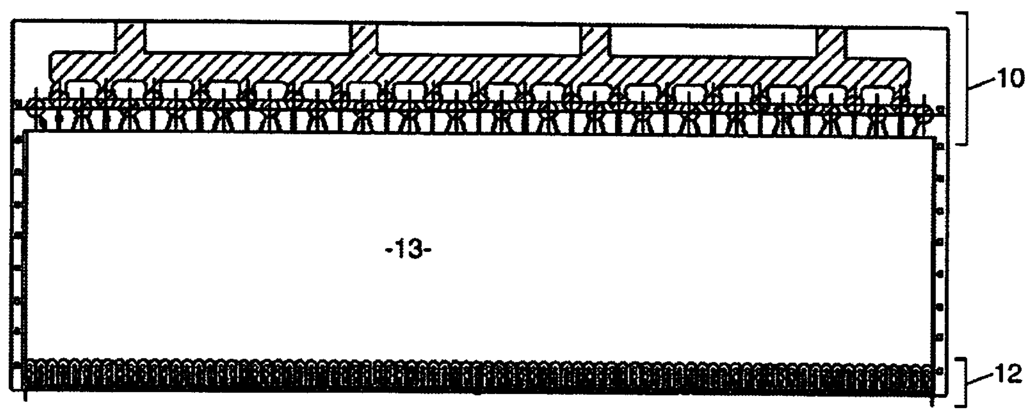
FIG. 1 is a simplified cross-sectional view of a high energy DF or HF chemical laser gain generator assembly.

As shown in the drawings for purposes of illustration, the present invention pertains to the structure and fabrication of gain generator assemblies for high energy DF (deuterium fluoride) or hydrogen fluoride (HF) chemical lasers. In accordance with the invention, a gain generator structure is fabricated, using platelet technology, to include very small water (or other media) cooling passages and laser gas manifolding into cavity injector blades and end walls of structure. Platelets are thin metal sheets in which fluid paths and openings are chemically etched in patterns determined by the use of a photographic negative. The platelets are then stacked in a precise, predetermined sequence to form the desired passages and openings, and are fused together by diffusion bonding at suitably high temperatures and pressures. Because the passages and openings are formed to a high degree of precision by photolithographic techniques, they may be of almost any desired size, shape or cross section.

Platelet manufacturing technology is well known from the technical literature. For example, see "Platelet Injector Design and Development History," by H. H. Mueggenburg and D. C. Rousar, Doc. No. PRR-SA-OSD #91-1630, May, 17, 1991, available from Aerojet Propulsion Div., Security Dept., P.O. Box 13222, Sacramento, Calif. 95813, and "Platelet Actively Cooled Thermal Management Devices," by H. H. Mueggenburg, J. W. Hidahl, E. L. Kessler and D. C. Rousar, Doc. No. PRA-SA-OSD 92-2332/L, Jun. 24, 1992, published by the American Institute of Aeronautics and Astronautics, Inc. with permission.

The principles of operation of DF or HF chemical lasers are well known and will not be explained in detail here. See, for example, "Deuterium Fluoride CW Lasers," by Leroy E. Wilson and D. L. Hook, American Inst. of Aeronautics and Astronautics (AIAA) Paper No. 76–344, presented at 9$^{th}$ Fluid and Plasma Dynamics Conf., San Diego, Calif., Jul. 14–16, 1976. Chemical lasing operates on a population inversion produced, directly and indirectly, in the course of an exothermic chemical reaction between atomic fluorine (F) and deuterium ($D_2$). Excited DF molecules are produced by the exothermic reaction:

$$F+D_2+He \rightarrow DF(v=0,4)+D+He$$

The fluorine atoms are produced in a combustor section of the gain generator assembly, from a combustion reaction between excess nitrogen fluoride ($NF_3$) or molecular fluorine ($F_2$) and ethylene ($C_2H_4$) or another hydrocarbon fuel (or $D_2$ in the case of an HF laser), with helium (He), to produce typically 90 percent F-atoms in a supersonic stream. Deuterium ($D_2$) is added to the supersonic stream of atomic fluorine in a bank of nozzles in the gain generator assembly, and the exothermic reaction mentioned above takes place at the exit plane of the nozzle bank, in a cavity that in part defines an optical resonator. The resulting optical beam derives its power from the combustion process, and operates in continuous wave (CW) mode so long as the combustion process continues and the various gases and diluents are supplied to the gain generator assembly.

A key design characteristic of the gain generator assembly is its method of cooling. In accordance with the present invention, combustor and nozzle components are cooled by water or other cooling media passing through many very small internal passages within the gain generator structure. While this might seem like a simple expedient, addition of such water passages was not practical using conventional fabrication methods for the MIRACL technology. This has led to less than desirable characteristics of the gain generator assembly, including the need to use lower strength unalloyed nickel to withstand higher operating temperatures. It will be understood that the term "water cooling" also includes cooling by suitable fluids other than water.

Figures 2, 3:
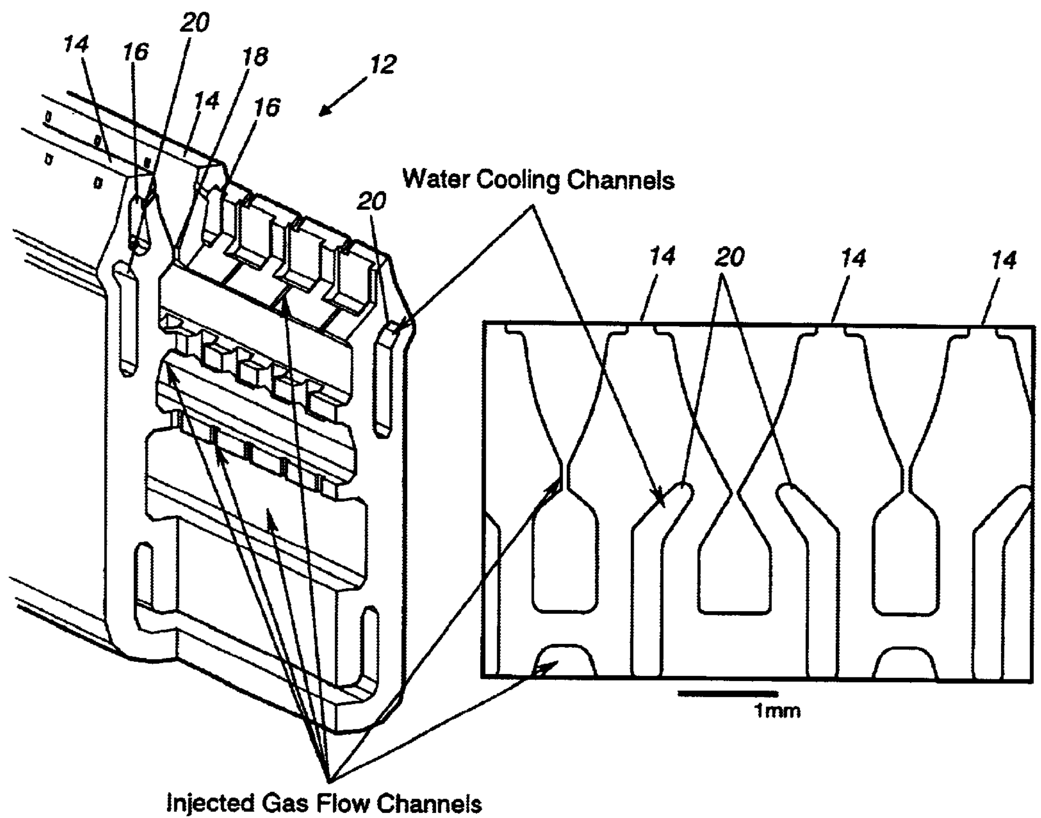
FIG. 2 is a fragmentary perspective view of a cavity injector structure in accordance with the invention, with portions removed for purposes of illustration.
FIG. 3 is a reproduction of a scanning electron microscope photograph of a multiple platelet, diffusion bond segment of the cavity injection structure shown in FIG. 2.

FIG. 1 shows in general a portion of a gain generator structure, including combustor inlet manifolds 10, a bank of cavity injector nozzles 12, and a combustion chamber 13. FIG. 2 shows, by way of example, the structure of a portion of the bank of cavity injector nozzles 12, with portions broken away to expose interior passages. Specifically, the structure includes many cavity injector blades, two of which are shown at 14. Each injector blade 14 has passages, such as the ones shown at 16, through which gases are injected. There are also gas flow channels 18 located between adjacent injector blade 14. More importantly from the standpoint of the invention, the structure also includes many water cooling, channel 20 internal to the injector blades 14.

FIG. 3 is a scanning electron microscope (SEM) photograph of a portion of an actual cavity injector blade assembly 14 of FIG. 2. A one-millimeter reference line in the photograph shows that each injector blade 14 is on the order of only one millimeter in width. The thickness of each platelet, such as those comprising the diffusion bonded assembly depicted in FIG. 3, is commensurate with the minimum internal feature size. For a chemical laser cavity injector, this usually results in a platelet thickness of 0.002 inch (0.05 mm). The etched platelets are stacked in proper sequence on alignment pins, and then diffusion bonded together at high pressure and temperature, to form an integral component containing all of the required feed passages, nozzles, injector orifices and so forth.

Application of the platelet manufacturing technique to the fabrication of a chemical laser gain generator has many advantages, one of the most important being a large reduction in manufacturing cost, by approximately a factor of ten. Similarly, lead times required to complete manufacture can be reduced from years to months. More important, however, are the improvements in performance characteristics that result from using the platelet fabrication technology.

Because platelet construction facilitates water cooling of the intricate combustor and cavity injector blade components, the gain generator assembly operates at lower and much more uniform temperatures and, since gas cooling is no longer the primary cooling technique, the need for tortuous gas cooling passages is obviated and gas inlet pressures can be reduced from approximately 1,500 psia to approximately 400 psia. This pressure reduction results, in turn, in a significant improvement in tank expulsion efficiency and an attendant reduction in the overall size and weight of the laser system.

Water cooling has another important result. The lower and more uniform temperature of operation permits the use of high strength nickel alloys, such as Inconel 718 alloy. This allows for the use of significantly larger unsupported structures in the gain generator. When weaker unalloyed nickel was used, support structures were needed and these caused degradation of the laser beam quality. Therefore, the use of water cooling facilitates the elimination of the thermal and corresponding density gradients that adversely affected the quality of the lasing medium. The exclusive use of Inconel 718 in the gain generator of the present invention also reduces the possibility of plastic deformation to a minimum, resulting in a very high or unlimited cycle life performance.

Finally, the use of platelet fabrication technology allows designers to incorporate a helium/$D_2$ gas flow configuration that eliminates large variations in dynamic pressure and stagnation temperatures and, therefore, improves the quality of the laser medium and, consequently, the laser beam quality.

From the foregoing, it will be appreciated that the present invention provides a significant improvement in the structure and fabrication of gain generators for high energy DF or HF chemical lasers. In particular, the use of platelet fabrication technology not only reduces manufacturing time and cost, but also allows the gain generator of the invention to be water cooled and this, in turn, results in lower more uniform operating temperatures and pressures, longer cycle life, elimination of supporting structures and improved beam quality. It will also be appreciated that, although a specific embodiment of the invention has been illustrated and described by way of example, various modifications may be made without departing from the spirit and scope of the invention. Accordingly, the invention should not be limited except as by the appended claims.

We claim:

1. A high energy DF chemical laser gain generator, comprising:

a combustor for generating atomic fluorine (F), including a plurality of combustor injectors, for Injecting into the combustor a gas containing fluorine and hydrocarbon fuel;

a laser cavity in which lasing takes place as a result of a chemical reaction between the atomic fluorine (F) and deuterium ($D_2$); and a plurality of laser cavity injector blades, for injecting deuterium ($D_2$) with the atomic fluorine into the laser cavity;

wherein the laser cavity injector blades include internal passages for flow of gas and internal passages for flow of cooling water;

and wherein the gain generator is formed from a plurality of uniformly thin, flat platelets of metal, each of which defines a cross-sectional slice of the gain generator, including the injector blades, and in which, the internal passages for flow of cooling water and gas are formed by chemical etching of each platelet separately, to define cross-sectional elements of the internal passages;

whereby the water-cooled laser gain generator operates at relatively low temperatures and avoids the need for high gas inlet pressures.

2. A high energy DF chemical laser gain generator as defined in claim 1, wherein all of the platelets forming the laser gain generator are of a high strength alloy having sufficient strength to avoid the need for supporting structures within the gain generator.

3. A high energy DF chemical laser gain generator as defined in claim 2, wherein the high strength alloy is selected from the group consisting of Inconel 718 alloy, Inco 600, Haynes alloy L 605, and Waspaloy.

4. A high energy HF chemical laser gain generator, comprising:

a combustor for generating atomic fluorine (F), including a plurality of combustor injectors, for Injecting into the combustor a gas containing fluorine and deuterium ($D_2$);

a laser cavity in which lasing takes place as a result of a chemical reaction between the atomic fluorine (F) and deuterium ($D_2$); and a plurality of laser cavity injector blades, for injecting deuterium ($D_2$) or $H_2$ with the atomic fluorine into the laser cavity;

wherein the laser cavity injector blades Include internal passages for flow of gas and internal passages for flow of cooling water;

and wherein the gain generator is formed from a plurality of uniformly thin, flat platelets of metal, each of which defines a cross-sectional slice of the gain generator, including the injector blades, and in which the internal passages for flow of cooling water and gas are formed by chemical etching of each platelet separately, to define cross-sectional elements of the internal passages;

whereby the water-cooled laser gain generator operates at relatively low and uniform temperatures and avoids the need for high gas inlet pressures.

5. A high energy HF chemical laser gain generator as defined in claim 4, wherein all of the platelets forming the laser gain generator are of a high strength alloy having sufficient strength to avoid the need for supporting structures within the gain generator.

6. A high energy HF chemical laser gain generator as defined in claim 5, wherein the high strength alloy is selected from the group consisting of Inconel 718 alloy, Inco 600, Haynes allow L605, and Waspaloy.

* * * * *